United States Patent
Zhang et al.

(10) Patent No.: US 11,525,938 B2
(45) Date of Patent: Dec. 13, 2022

(54) OCEAN BOTTOM ELECTROMAGNETIC ACQUISITION STATION COMMUNICATION APPARATUS AND METHOD

(71) Applicant: Institute of Geology and Geophysics, Chinese Academy of Sciences, Beijing (CN)

(72) Inventors: Tianxin Zhang, Beijing (CN); Zhongxing Wang, Beijing (CN); Qingyun Di, Beijing (CN); Zhiyao Liu, Beijing (CN); Lili Kang, Beijing (CN); Renzhong Pei, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/711,950

(22) Filed: Apr. 1, 2022

(65) Prior Publication Data
US 2022/0221613 A1    Jul. 14, 2022

Related U.S. Application Data

(63) Continuation of application No. PCT/CN2021/090902, filed on Apr. 29, 2021.

(30) Foreign Application Priority Data

May 14, 2020  (CN) .......................... 202010407191.9

(51) Int. Cl.
*G01V 3/38* (2006.01)
*G01V 3/12* (2006.01)

(52) U.S. Cl.
CPC . *G01V 3/38* (2013.01); *G01V 3/12* (2013.01)

(58) Field of Classification Search
CPC .................................. G01V 3/38; G01V 3/12
See application file for complete search history.

(56) References Cited

U.S. PATENT DOCUMENTS

| 10,429,538 B1 | 10/2019 | Venezia et al. |
| 2009/0085569 A1 | 4/2009 | Lisitsyn et al. |
| 2016/0001860 A1* | 1/2016 | Mizunaga ............. B63G 8/001 114/331 |

FOREIGN PATENT DOCUMENTS

| CN | 102353995 A | 2/2012 |
| CN | 204965085 U * | 1/2016 |

(Continued)

OTHER PUBLICATIONS

Ming Deng et al., "Several theoretical points and instrument technology of magnetotelluric data acquisition in deep water", Chinese J. Geophys., Nov. 30, 2013.

(Continued)

*Primary Examiner* — Alexander Satanovsky
*Assistant Examiner* — Lynda Dinh
(74) *Attorney, Agent, or Firm* — Dragon Sun. Law Firm, PC; Jinggao Li; Nathaniel Perkins

(57) ABSTRACT

Disclosed is an ocean bottom electromagnetic acquisition station communication apparatus and method. The ocean bottom electromagnetic acquisition station communication apparatus includes: ocean bottom electromagnetic acquisition stations (1) for acquiring ocean bottom electromagnetic information; a control terminal (2) for sending control signals; and a relay timing module (3) connected to the ocean bottom electromagnetic acquisition stations (1) and the control terminal (2) and used for processing the ocean bottom electromagnetic acquisition stations (1) on the basis of the control signals before placement. The ocean bottom electromagnetic acquisition station communication apparatus in the present disclosure has a simple structure, and a (Continued)

plurality of ocean bottom electromagnetic acquisition stations (1) are controlled by means of the relay timing module (3) between the control terminal (2) and the ocean bottom electromagnetic acquisition stations (1), such that structures of the ocean bottom electromagnetic acquisition stations (1) are simplified.

3 Claims, 5 Drawing Sheets

(56) References Cited

FOREIGN PATENT DOCUMENTS

| CN | 107462921 | A |   | 12/2017 |
|----|-----------|---|---|---------|
| CN | 109061720 | A |   | 12/2018 |
| CN | 109143325 | A | * | 1/2019  |
| CN | 107462921 | B | * | 8/2020  |
| CN | 111551998 | A |   | 8/2020  |

OTHER PUBLICATIONS

Hai-Feng Wang et al., "AHRS recorder for MCSEM receiver", Progress in Geophysics, Dec. 31, 2015.
International Search Report of PCT/CN2021/090902.
Written Opinion of PCT/CN2021/090902.

* cited by examiner

US 11,525,938 B2

OCEAN BOTTOM ELECTROMAGNETIC ACQUISITION STATION COMMUNICATION APPARATUS AND METHOD

CROSS-REFERENCE TO RELATED APPLICATIONS

This application is a bypass continuation application of International Patent Application No.: PCT/CN2021/090902, which claims priority to Chinese Patent Application No. 202010407191.9, filed with the Chinese Patent Office on May 14, 2020 and entitled "OCEAN BOTTOM ELECTROMAGNETIC ACQUISITION STATION COMMUNICATION APPARATUS AND METHOD." The above-referenced applications are incorporated herein by reference in their entirety.

TECHNICAL FIELD

The present disclosure relates to the field of exploration, in particular to an ocean bottom electromagnetic acquisition station communication apparatus and method.

BACKGROUND

As an indispensable method in ocean oil and gas exploration technology, an ocean electromagnetic method is used to measure distribution rules of artificially emitted or naturally excited ocean bottom electromagnetic fields on the sea or under the sea to explore ocean bottom geological structures, so as to identify high-resistance oil and gas reservoirs, thereby directly explore oil and gas. An electromagnetic data recorder, which is a crucial apparatus for ocean electromagnetic exploration, is carried on an ocean bottom electromagnetic acquisition station or a towed electric field acquisition station and is used for acquiring and recording weak electric field and magnetic field signals under the sea. In actual work, several ocean bottom electromagnetic acquisition stations are required to be started up at a target site at first, then acquisition parameters are set, and finally, the ocean bottom electromagnetic acquisition stations are sequentially placed at intervals, where the interval is usually several kilometers. After required data is acquired, ocean bottom electromagnetic receivers are sequentially placed back on a scientific research ship. However, in the prior art, the ocean bottom electromagnetic acquisition station is in direct communication with a control terminal, such that an apparatus for "interpreting" a command of the control terminal needs to be installed in the ocean bottom electromagnetic acquisition station, which makes mechanisms of the ocean bottom electromagnetic acquisition station complicated.

SUMMARY

The objective of the present disclosure is to provide an ocean bottom electromagnetic acquisition station communication apparatus and method, which may simplify structures of ocean bottom electromagnetic acquisition stations.

A first aspect of the present disclosure provides an ocean bottom electromagnetic acquisition station communication apparatus. The apparatus includes: ocean bottom electromagnetic acquisition stations for acquiring ocean bottom information; a control terminal for sending control signals; and a relay timing module connected to the ocean bottom electromagnetic acquisition stations and the control terminal and used for processing the ocean bottom electromagnetic acquisition stations on the basis of the control signals before placement.

Further, the processing before placement includes awakening, timing, setting parameter and starting acquisition mode.

Further, the relay timing module includes a global positioning system (GPS) module, and the GPS module is used for carrying out timing on the ocean bottom electromagnetic acquisition stations.

Further, the ocean bottom electromagnetic acquisition stations are connected to the control terminal and used for sending the ocean bottom information to the control terminal.

Further, the apparatus further include cables, where one end of each cable is connected to the corresponding ocean bottom electromagnetic acquisition station, and the other end of each cable is divided into two strands for being connected to the control terminal and the relay timing module respectively.

Further, the ocean bottom electromagnetic acquisition stations include: circuit boards for recording the ocean bottom information; water-proof pressure case arranged at outer sides of the circuit boards and used for protecting the circuit boards; and water-proof and pressure-resistant connectors arranged on the water-proof pressure case, where one end of each water-proof and pressure-resistant connector is connected to the corresponding circuit board, and the other end thereof is connected to one end of the corresponding cable.

Further, each cable is a thirteen-core communication cable, where four cores are used for being connected to the control terminal, eight cores are used for being connected to the relay timing module, and the relay timing module is connected to the control terminal by means of a universal serial bus (USB).

Further, each water-proof and pressure-resistant connector is a thirteen-core water-proof and pressure-resistant connector.

Further, the ocean bottom electromagnetic acquisition stations further include: gravity blocks each arranged on one side of the corresponding water-proof pressure case and used for providing gravity; and flotation spheres each arranged on the other side of the corresponding water-proof pressure case and used for providing buoyancy.

A second aspect of the present disclosure provides an ocean bottom electromagnetic acquisition station communication method. Using the above ocean bottom electromagnetic acquisition station communication apparatus for communication includes: acquiring control signals; and processing ocean bottom electromagnetic acquisition stations on the basis of the control signals before placement.

REFERENCE NUMERALS

1: ocean bottom electromagnetic acquisition station; 11: circuit board; 12: water-proof pressure case; 121: end cap; 13: water-proof and pressure-resistant connector; 14: gravity block; 15: flotation spheres; 16: battery;
2: control terminal;
3: relay timing module; and 31: global positioning system (GPS) antenna.

DESCRIPTION OF EMBODIMENTS

In order to make the objective, the technical solutions and the advantages of the present disclosure clearer, the present disclosure will be described in further detail below with reference to the specific implementations and the accompanying drawings. It should be understood that these descriptions are only exemplary and not intended to limit the scope of the present disclosure. In addition, in the following descriptions, descriptions of well-known structures and technologies are omitted in order to avoid unnecessarily obscuring the concepts of the present disclosure.

Schematic diagrams of layer structures according to the embodiments of the present disclosure are shown in the accompanying drawings. Theses diagrams are not drawn to scale, and for the purpose of clarity, certain details are enlarged and certain details may be omitted. The shapes of various regions and layers shown in the figures, as well as the relative size and position relation between them, are only exemplary, and may vary in practice due to manufacturing tolerances or technical limitations, and a person skilled in the art may additionally design regions/layers having different shapes, sizes and relative positions according to actual needs.

Apparently, the embodiments described are merely some rather than all of the embodiments of the present disclosure. On the basis of the embodiments of the present disclosure, all other embodiments obtained by a person of ordinary skill in the art without making creative efforts shall fall within the scope of protection of the present disclosure.

Figure 2:
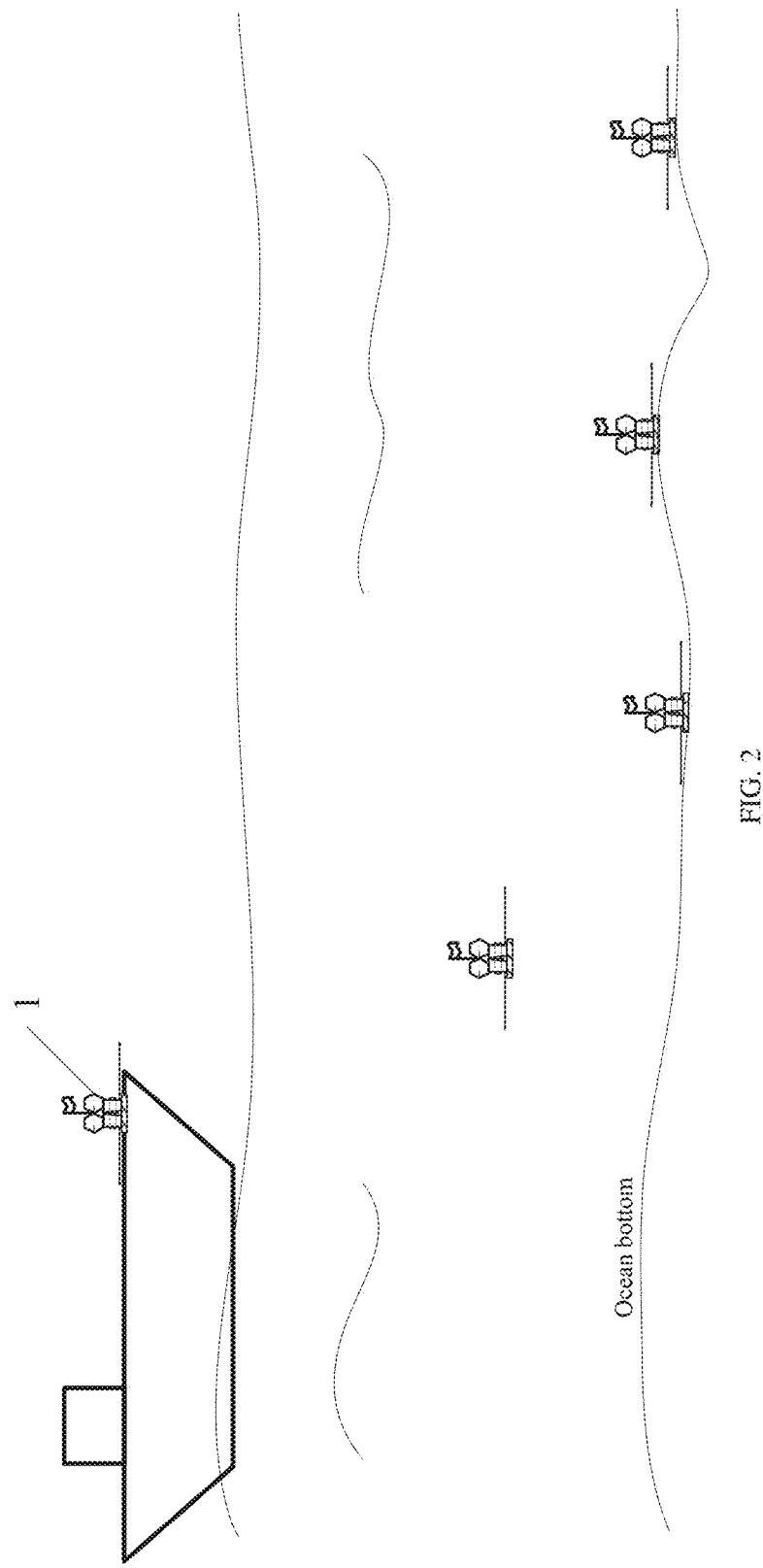
FIG. 2 is a schematic diagram of a placement process for ocean bottom electromagnetic acquisition stations.

Before description of the embodiments of the present disclosure, the basic information of ocean bottom electromagnetic acquisition stations 1 will be briefly described. With reference to FIG. 2, the ocean bottom electromagnetic acquisition stations 1 are in a standby state before placement, and after a scientific research ship reaches target placement area, the ocean bottom electromagnetic acquisition stations 1 are processed on a deck before placement, so as to awaken the ocean bottom electromagnetic acquisition stations 1 and conveniently place the ocean bottom electromagnetic acquisition stations on an ocean bottom for ocean bottom electromagnetic information acquisition. After the ocean bottom electromagnetic acquisition stations 1 are placed on one site, data in several days will be acquired generally, and the data amount may reach several gigabytes (GBs). With a sampling rate of 150 Hz, five channels, a 24-bit analog-to-digital converter (ADC), etc., 5.43 GB of data is acquired after work for 30 days. After the data is acquired, the data stored in an acquisition station circuit is required to be downloaded to a local computer. In order to compute time required for a plurality of acquisition stations to download the data, it is necessary to consider time for each acquisition station to access a control terminal 2 (a computer).

TABLE 1

| Table of download speed and time for 5 GB of data | |
|---|---|
| Download speed | Download time |
| 10 MB/s | 8.5 min |
| 1 MB/s | 85 min (1 hour and 25 minutes) |
| 0.5 MB/s | 170 min (2 hours and 50 minutes) |
| 0.1 MB/s | 853 min (14 hours and 13 minutes) |

Embodiment 1

Figure 1:
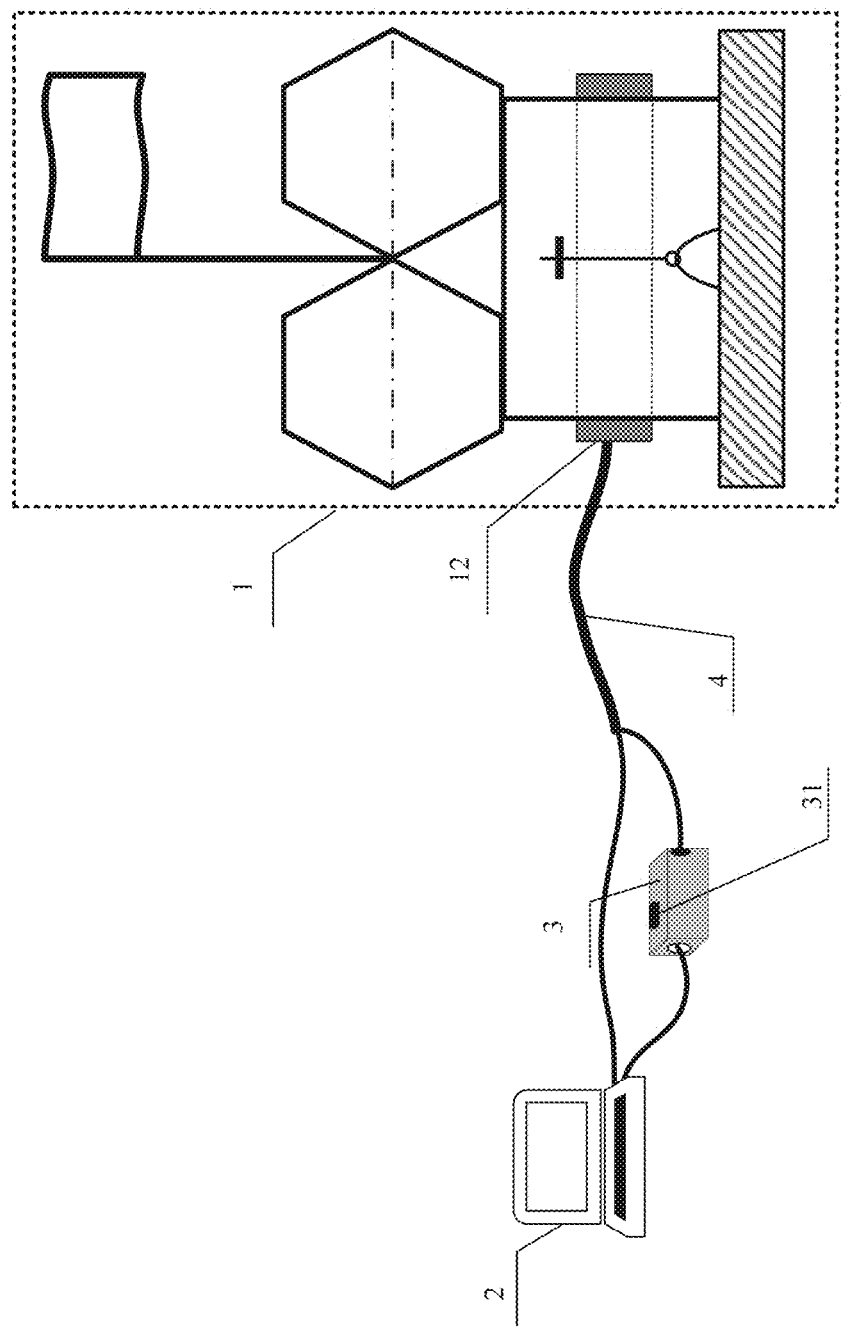
FIG. 1 is a structural schematic diagram of an ocean bottom electromagnetic acquisition station communication apparatus in the present disclosure.

FIG. 1 is a structural schematic diagram of an ocean bottom electromagnetic acquisition station communication apparatus in the present disclosure.

With reference to FIG. 1, the embodiment provides an ocean bottom electromagnetic acquisition station communication apparatus. The apparatus includes: ocean bottom electromagnetic acquisition stations 1 for acquiring ocean bottom electromagnetic information; a control terminal 2 for sending control signals; and a relay timing module 3 connected to the ocean bottom electromagnetic acquisition stations 1 and the control terminal 2 and used for processing the ocean bottom electromagnetic acquisition stations 1 on the basis of the control signals before placement. After the ocean bottom electromagnetic acquisition stations 1 are processed before placement, the ocean bottom electromagnetic acquisition stations 1 send successful receiving information to the relay timing module 3.

The ocean bottom electromagnetic acquisition station communication apparatus in the present disclosure has a simple structure, and a plurality of ocean bottom electromagnetic acquisition stations 1 are controlled by means of one relay timing module 3 between the control terminal 2 and the ocean bottom electromagnetic acquisition stations 1, such that structures of the ocean bottom electromagnetic acquisition stations 1 are simplified.

Specifically, the processing before placement includes awakening, timing, setting parameter and starting acquisition mode. The control signals of the control terminal 2 include an awakening command, a parameter setting command, an acquisition command, etc. for the ocean bottom electromagnetic acquisition stations 1. The relay timing module 3 includes a global positioning system (GPS) module, the GPS module includes a GPS antenna 31, and the GPS module is used for carrying out timing to the ocean bottom electromagnetic acquisition stations 1. The relay timing module 3 receives the control signals of the control terminal 2 and adds a timing command to process the ocean bottom electromagnetic acquisition stations 1 together before placement, where timing is to determine a geographical position in which the ocean bottom electromagnetic acquisition station 1 is placed and uniform universal time coordinated (UTC) for the ocean bottom electromagnetic acquisition station 1 to be processed currently before placement. Set parameters include a sampling rate, gain, acquisition starting and stopping time, etc.

After acquiring the ocean bottom electromagnetic information, the ocean bottom electromagnetic acquisition stations 1 are returned to the scientific research ship to be connected to the control terminal 2, so as to send the acquired ocean bottom electromagnetic information to the control terminal 2.

In an optional implementation solution of the embodiment, the ocean bottom electromagnetic acquisition station communication apparatus further include cables 4. One end of each cable 4 is connected to the corresponding ocean bottom electromagnetic acquisition station 1. The other end of each cable 4 is divided into two strands for being connected to the control terminal 2 and the relay timing module 3 respectively.

Figure 3:
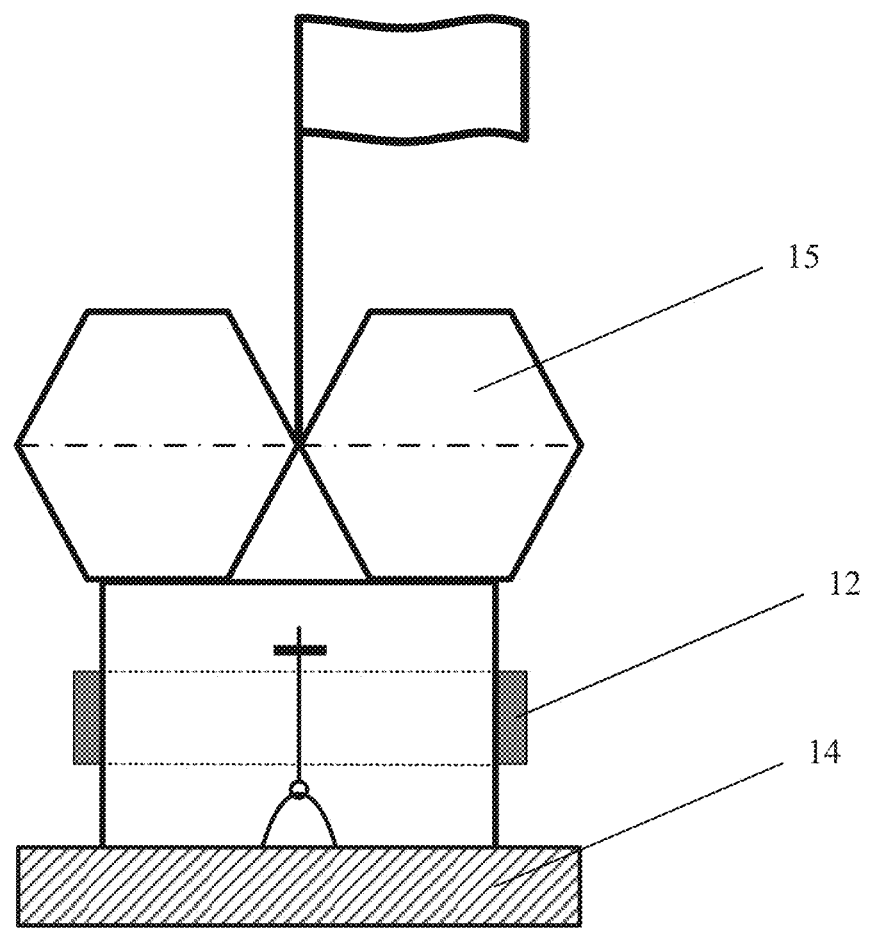
FIG. 3 is a structural schematic diagram of an ocean bottom electromagnetic acquisition station in the present disclosure.

FIG. 3 is a structural schematic diagram of an ocean bottom electromagnetic acquisition station in the present disclosure.

With reference to FIG. 3, in an optional implementation solution of the embodiment, the ocean bottom electromagnetic acquisition stations 1 further include: gravity blocks 14 each arranged on one side of the corresponding water-proof pressure case 12 and used for providing gravity on one side of the water-proof pressure case 12; and flotation spheres 15 each arranged on the other side of the corresponding water-proof pressure case 12 and used for providing buoyancy on the other side of the water-proof pressure case 12. One side, provided with the flotation spheres 15 in the sea, of each ocean bottom electromagnetic acquisition station 1 faces upwards, and one side, provided with the gravity block 14, of each ocean bottom electromagnetic acquisition station faces downwards, so as to ensure that the ocean bottom electromagnetic acquisition stations 1 fall upright, and the ocean bottom electromagnetic acquisition stations 1 may conveniently acquire the ocean bottom electromagnetic information. Connecting structures are further arranged in the ocean bottom electromagnetic acquisition stations, so as to connect the gravity blocks 14, the water-proof pressure cases 12 and the flotation spheres 15 together. The ocean bottom electromagnetic acquisition stations are further provided with ocean bottom electromagnetic acquisition modules for acquiring the ocean bottom electromagnetic information and storing the ocean bottom electromagnetic information in the circuit boards 11.

Figure 4:
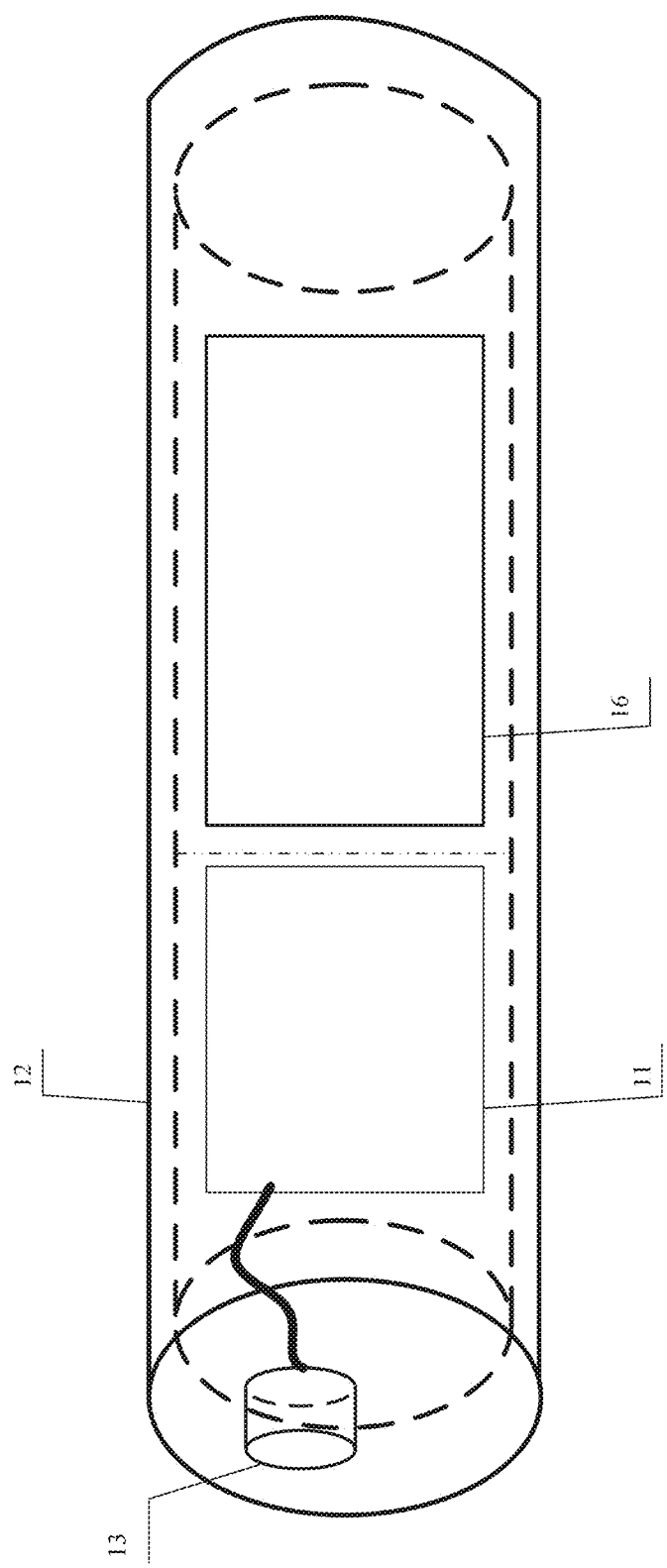
FIG. 4 is a structural schematic diagram of a water-proof pressure case in the present disclosure.
Figure 5:
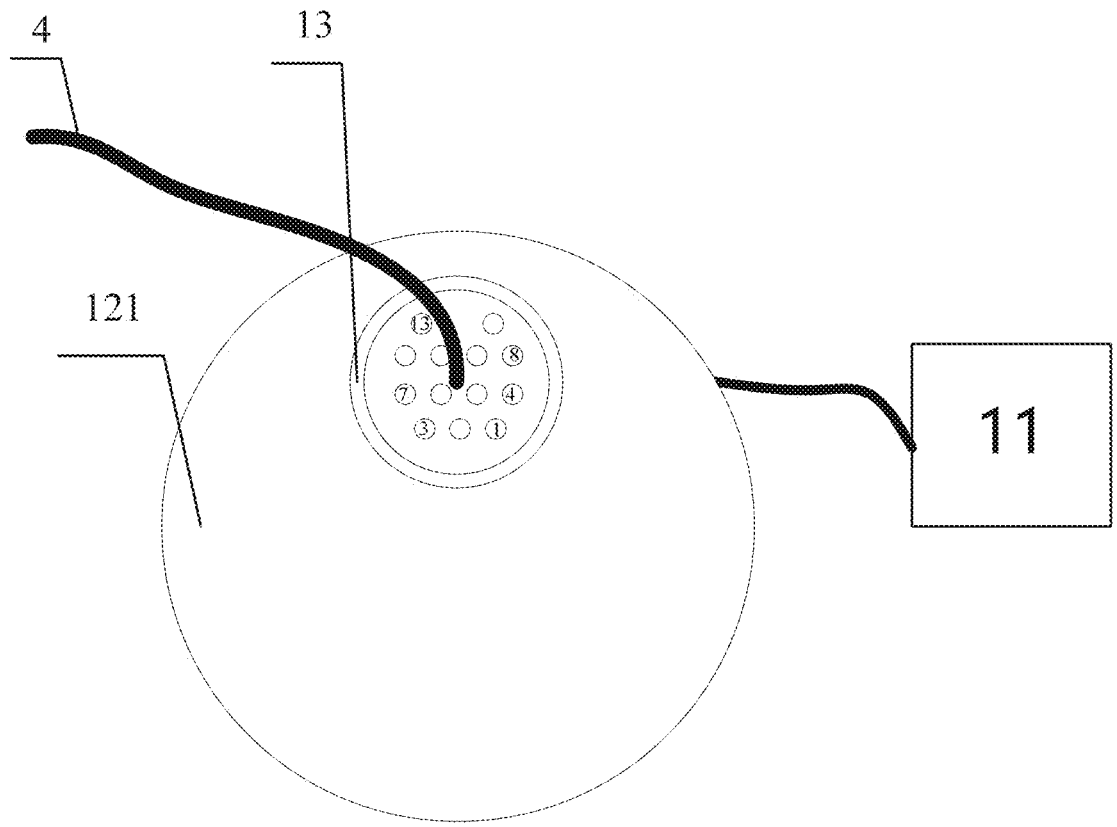
FIG. 5 is a structural schematic diagram of an end face of a water-proof pressure case in the present disclosure.

FIG. 4 is a structural schematic diagram of the water-proof pressure case in the present disclosure. FIG. 5 is a structural schematic diagram of an end face of the water-proof pressure case in the present disclosure.

With reference to FIGS. 4 and 5, in an optional implementation solution of the embodiment, the ocean bottom electromagnetic acquisition stations 1 include: circuit boards 11 for recording the ocean bottom electromagnetic information on the basis of a processing-before-placement command sent from the relay timing module 3; water-proof pressure case 12 arranged on outer sides of the circuit boards 11 and used for protecting the circuit boards 11; and water-proof and pressure-resistant connectors 13 arranged on the water-proof pressure case 12 and specifically arranged on end cap 121, where one end of each water-proof and pressure-resistant connector 13 is connected to the corresponding circuit board 11, and the other end thereof is connected to one end of the corresponding cable 4. The ocean bottom electromagnetic acquisition stations 1 do not need to be internally provided with GPS modules and GPS antennas, and circuit boards 11 have small areas, such that cost is reduced, and electromagnetic influences of the GPS antennas on the ocean bottom electromagnetic acquisition stations 1 are removed. The cables 4 are connected to the water-proof and pressure-resistant connectors 13 matching the cables 4, such that the water-proof pressure cases 12 are kept sealed, so as to better protect the circuit boards 11. Batteries 16 are further arranged in the water-proof pressure case 12 and used for supplying power.

In an optional implementation solution of the embodiment, a model number of each water-proof and pressure-resistant connector 13 is DIL13F, and a model number of each corresponding thirteen-core communication cable is DBH13MSS.

The ocean bottom electromagnetic acquisition stations 1 further include acquisition modules for acquiring the ocean bottom electromagnetic information.

In an optional implementation solution of the embodiment, each cable 4 is a thirteen-core communication cable. Four cores are used for being connected to the control terminal 2, specifically for connecting the control terminal 2 to the circuit boards 11 in a network communication manner. Eight cores are used for being connected to the relay timing module 3, specifically for connecting the relay timing module 3 to the circuit boards 11. Each water-proof and pressure-resistant connector 13 is a thirteen-core water-proof and pressure-resistant connector 13. The control terminal 2 is a three-proofing notebook computer with a model number of B300 and a grade of IP68, which has a standard RJ45 network interface and at least two universal serial bus (USB) 3.0 interfaces, has a screen highlight display function so as to be seen in strong sunlight, and has battery time of 8 h. The three-proofing notebook computer is provided with a four-core USB, and the control terminal 2 controls the relay timing module 3 by means of the USB and four cores of each thirteen-core communication cable. The relay timing module 3 converts the received control signals into serial RS232 level signals, and is in communication with the circuit boards 11 by means of eight cores of each thirteen-core communication cable. A watertight connector on the relay timing module 3 includes a four-core interface and is connected to the control terminal 2 by means of an exterior of the four-core interface, and an interior of the four-core interface is connected to a hardware circuit in the relay timing module 3. See the following table for a connection relation between a thirteen-core communication cable and a control terminal 2, a relay timing module 3 and a circuit board 11.

TABLE 2

Connection relation between thirteen-core communication cable and control terminal 2, relay timing module 3 and circuit board 11

| Color and function of thirteen-core communication cable | Relay timing module | Control terminal | Circuit board |
| --- | --- | --- | --- |
| 1 black RXD_GPS | connected | / | connected |
| 2 orange NC | / | / | / |
| 3 white GND | connected | / | connected |
| 4 brown PPS | connected | / | connected |
| 5 brown and white GND | connected | / | connected |
| 6 blue RXD_PC | connected | / | connected |
| 7 blue and white TXD_PC | connected | / | connected |
| 8 orange RX− | / | connected | connected to a network interface of a circuit board |
| 9 orange and white RX+ | / | connected | |
| 10 green Tx− | / | connected | |
| 11 green and white TX+ | / | connected | |
| 12 red TXD_MCU | connected | / | connected |
| 13 green RXD_MCU | connected | / | connected |

Embodiment 2

Figure 6:
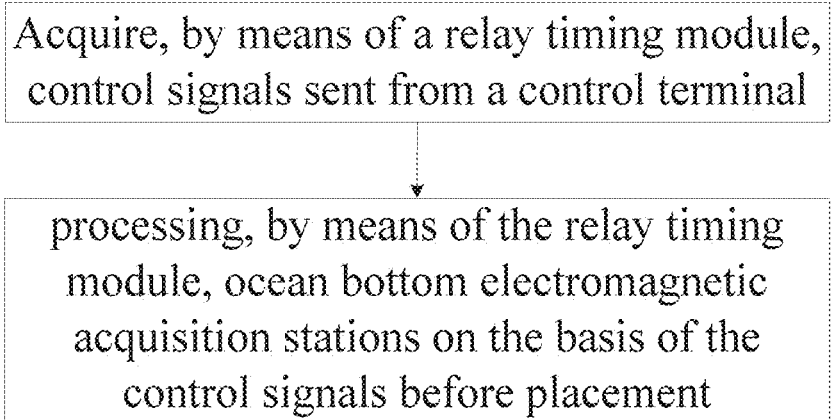
FIG. 6 is a flow diagram of an ocean bottom electromagnetic acquisition station communication method in the present disclosure.

FIG. 6 is a flow diagram of an ocean bottom electromagnetic acquisition station 1 communication method in the present disclosure.

With reference to FIG. 6, the embodiment provides an ocean bottom electromagnetic acquisition station 1 communication method. Using the ocean bottom electromagnetic acquisition station communication apparatus in Embodiment 1 for communication includes: acquire control signals; and process, ocean bottom electromagnetic acquisition stations 1 on the basis of the control signals before placement. A relay timing module 3 acquires the control signals sent from a control terminal 2. The relay timing module 3 process the ocean bottom electromagnetic acquisition stations 1 on the basis of the control signals before placement.

The ocean bottom electromagnetic acquisition station 1 communication method provided in the embodiment is simple and easy to implement, and the ocean bottom electromagnetic acquisition station communication apparatus has a simple structure and may control a plurality of ocean bottom electromagnetic acquisition stations 1, such that structures of the ocean bottom electromagnetic acquisition stations 1 are simplified.

The relay timing module 3 acquires the control signals from the control terminal 2.

In an optional implementation solution of the embodiment, the ocean bottom electromagnetic acquisition station 1 communication method further includes: acquire ocean bottom electromagnetic information by means of the ocean bottom electromagnetic acquisition stations 1 and send the ocean bottom electromagnetic information to the control terminal 2.

It should be understood that the above specific implementations of the present disclosure are merely used for exemplary descriptions or for explaining the principles of the present disclosure, rather than limiting the present disclosure. Therefore, any modifications, equivalent substitutions, improvements, etc. made within the spirit and scope of the present disclosure shall fall within the scope of protection of the present disclosure. In addition, the appended claims of the present disclosure are intend to cover all changes and modifications falling within the scopes and boundaries of the append claims, or equivalents of such scopes and boundaries.

What is claimed is:

1. An ocean bottom electromagnetic meter (OBEM) communication device, comprising:
    an OBEM (1), configured to collect ocean bottom electromagnetic information;
    a control terminal (2), configured to send a control signal;
    a transit timing module (3), connected with the OBEM (1) and the control terminal (2) respectively, and configured to perform pre-launch processing for the OBEM (1) based on the control signal, including wake-up, timing, parameter setting and entering a collection mode;
    the OBEM (1) is connected with the control terminal (2) to send the ocean bottom electromagnetic information to the control terminal (2);
    a cable (4), with one end connected with the OBEM (1), and the other end divided into two strands which are connected with the control terminal (2) and the transit timing module (3) respectively;
    the cable (4) is a 13-core communication cable, with 4 cores connected with the control terminal (2) and 8 cores connected with the transit timing module (3);
    the OBEM (1) comprises:
    a circuit board (11), configured to record ocean bottom electromagnetic information;
    a waterproof and pressure-proof protective chamber (12), arranged outside the circuit board (11) and configured to protect the circuit board (11); and
    a waterproof and pressure-resistant connector (13), arranged on the waterproof and pressure-proof protective chamber (12), wherein one end of the waterproof and pressure-resistant connector (13) is connected with the circuit board (11), and the other end is connected with one end of the cable (4);
    the waterproof and pressure-resistant connector (13) is a 13-core waterproof and pressure-resistant connector (13).

2. The OBEM communication device of claim 1, wherein the transit timing module (3) comprises a GPS module, and the GPS module is configured for timing of the OBEM (1).

3. The OBEM communication device of claim 1, wherein the OBEM (1) further comprises:
    a gravity block (14), arranged at one side of the waterproof and pressure-proof protective chamber (12) and used to provide gravity; and
    a floating chamber (15), arranged at the other side of the waterproof and pressure-proof protective chamber (12) and configured to provide buoyancy.

* * * * *